United States Patent
Kisaka

(10) Patent No.: US 7,317,591 B2
(45) Date of Patent: Jan. 8, 2008

(54) SERVO CONTROL FOR MAGNETIC DISK DRIVE

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/270,855

(22) Filed: Nov. 8, 2005

(65) Prior Publication Data

US 2006/0103970 A1  May 18, 2006

(30) Foreign Application Priority Data

Nov. 12, 2004  (JP) .............................. 2004-328544

(51) Int. Cl.
*G11B 5/596* (2006.01)
(52) U.S. Cl. .................... 360/77.08; 360/78.4
(58) Field of Classification Search ............... None
See application file for complete search history.

(56) References Cited

U.S. PATENT DOCUMENTS

| | | | |
|---|---|---|---|
| 6,487,028 B1 * | 11/2002 | Sri-Jayantha et al. | 360/25 |
| 6,532,129 B1 * | 3/2003 | Sri-Jayantha et al. | 360/77.02 |
| 6,615,361 B1 * | 9/2003 | Patapoutian | 713/503 |

FOREIGN PATENT DOCUMENTS

| | | |
|---|---|---|
| JP | 08-328664 | 12/1996 |
| JP | 2003-109334 | 4/2003 |
| JP | 2003-141830 | 5/2003 |

* cited by examiner

*Primary Examiner*—K. Wong
(74) *Attorney, Agent, or Firm*—Townsend and Townsend and Crew LLP; Patrick Duncan

(57) ABSTRACT

Embodiments of the invention provide a magnetic disk drive that exhibits excellent overall stability of a feedback control system even when the preset frequency for a peak filter significantly changes. In one embodiment, the symbol P denotes a VCM model, which outputs a head current position signal. The symbol C denotes a controller. The controller inputs a position error signal PES that is derived from a head current position signal output from the P, and outputs to addition point a control signal of a drive device for moving a magnetic head. Signal x to which disturbance noise is added enters a peak filter. The output y from the peak filter is output to addition point via a phase determination filter and added to a control signal output from the controller. A phase comparison frequency updater compares the phase of the position error signal against the output signal phase of the peak filter, changes the preset frequency for the peak filter in accordance with the result of comparison, and changes a transfer function for peak filter phase determination in accordance with a change in the preset frequency.

15 Claims, 17 Drawing Sheets

SERVO CONTROL FOR MAGNETIC DISK DRIVE

CROSS-REFERENCES TO RELATED APPLICATIONS

This application claims priority from Japanese Patent Application No. JP2004-328544, filed Nov. 12, 2004, the entire disclosure of which is incorporated herein by reference.

BACKGROUND OF THE INVENTION

The present invention relates to a magnetic disk drive, and more particularly to a servo control device for positioning a magnetic head on a target track of a magnetic disk.

The magnetic disk drive has a magnetic head for reading data stored on a magnetic disk or writing data onto the magnetic disk. The magnetic head is mounted in an actuator mechanism that is oscillated by a VCM (voice coil motor). When the magnetic head reads or writes data, the actuator mechanism is driven to move and position the magnetic head on a target track. Magnetic head move control is exercised in accordance with servo data, which is recorded on the magnetic disk, to position the magnetic head at a target position.

A plurality of data tracks are concentrically formed on the magnetic disk. Further, identification information and burst pattern are prerecorded in the direction of the diameter of the magnetic disk. The identification information represents the track address of each data track. In accordance with the identification information read by the magnetic head, it is possible to determine the approximate magnetic head position, that is, to determine the data track to which the magnetic head position corresponds. As regards the burst pattern, individual signal storage areas are arranged in the direction of the diameter and positioned at fixed spacing intervals, and there are a plurality of burst pattern rows, which differ in signal storage area phase. In accordance with a signal that the magnetic head generates according to a burst pattern, the precise magnetic head position can be determined. In other words, it is possible to detect the deviation (position error) of the magnetic head position from a data track to which the magnetic head corresponds.

Before data is read from or written onto the magnetic disk, the magnetic head is moved until it corresponds to a specific data track while determining the approximate magnetic head position in accordance with the identification information read by the magnetic head during magnetic disk rotation, and then the magnetic head is precisely positioned on a specific data track in accordance with a signal that the magnetic head generates according to a burst pattern. This sequence of operations is referred to as a seek operation. While data is being read or written, feedback control is exercised in accordance with a signal that the magnetic head generates according to a burst pattern so that the magnetic head is consistently positioned relative to a specific data track. This operation is referred to as a track following operation.

The magnetic disk is installed over the outer circumference of a spindle, which is rotated by a motor. In most cases, however, the center of the magnetic disk slightly deviates from the rotation center of the spindle due, for instance, to a manufacturing error. This deviation gives a particular, low-frequency disturbance to a control system that exercises feedback control to consistently position the magnetic head relative to a specific data track.

Further, the magnetic disk drive not only incurs a deviation of the rotation center of the spindle from the center of the magnetic disk, but also causes a high-frequency disturbance because, for example, the bearing of a spindle rotation motor is out of round. The high-frequency disturbance becomes a problem particularly in a case where the data track pitch on the magnetic disk is decreased (the data track width is reduced).

Patent Document 1 (Japanese Patent Laid-Open No. 328664/1996) states that the control system can be stabilized by selecting an appropriate digital filter phase when a disturbance having a known frequency is encountered. However, when a method described in Patent Document 1 is used, a disturbance having an unknown frequency cannot be handled. Patent Document 2 (Japanese Patent Laid-Open No. 109335/2003) states that when the phase of a position error signal (PES) is compared against the phase of a digital peak filter output signal to determine the phase relationship between the two signals, it is possible to ensure that the preset frequency for the digital peak filter follows the PES.

BRIEF SUMMARY OF THE INVENTION

The method described in Patent Document 2 is used to change the preset frequency so as to validate a digital peak filter gain. However, the overall stability of the feedback control system cannot be assured when the preset frequency significantly changes.

It is a feature of the present invention to provide a magnetic disk drive that exhibits excellent overall stability of a feedback control system even when the preset frequency for the peak filter significantly changes.

It is another feature of the present invention to provide a magnetic disk drive that uses a plurality of peak filters to inhibit the magnetic head position from being displaced by a plurality of disturbances.

A magnetic disk drive according to an aspect of the present invention comprises a magnetic disk for recording user data and servo data; a magnetic head for reading/writing user data and reading servo data at a specified access position of the magnetic disk; a controller for generating a position error signal in accordance with a servo data signal read by the magnetic head and outputting a control signal for a drive device that moves the magnetic head; a peak filter for inputting the position error signal, wherein a gain is valid for a preselected frequency; a phase filter for determining the phase of the peak filter; a mechanism for positioning the magnetic head at the access position in accordance with a control signal output from the controller and a signal output from the phase filter; and a phase comparison frequency updater for comparing the phase of the position error signal against the output signal phase of the peak filter, changing a preset frequency for the peak filter in accordance with the result of comparison, and changing a transfer function for determining the output signal phase of the peak filter in accordance with a change in the preset frequency.

The phase comparison frequency updater may compare the input signal phase of the peak filter against the output signal phase of the peak filter, and change the preset frequency for the peak filter in accordance with the result of comparison. The transfer function nay be a coefficient of the phase filter. The peak filter may be a digital peak filter.

A magnetic disk drive according to another aspect of the present invention comprises a magnetic disk for recording user data and servo data; a magnetic head for reading/writing user data and reading servo data at a specified access position of the magnetic disk; a controller for generating a position error signal in accordance with a servo data signal read by the magnetic head and outputting a control signal for a drive device that moves the magnetic head; a plurality of peak filters for inputting the position error signal, wherein a gain is valid for a preselected frequency; a plurality of phase filters for determining the phases of the peak filters; a mechanism for positioning the magnetic head at the access position in accordance with a control signal output from the controller and signal outputs from the plurality of phase filters; and a phase comparison frequency updater for comparing the phase of the position error signal against the output signal phases of the plurality of peak filters and changing preset frequencies for the plurality of peak filters in accordance with the results of comparison.

The phase comparison frequency updater may compare the input and output signal phases of some or all of the plurality of peak filters on an individual peak filter basis and change the preset frequencies for the plurality of peak filters in accordance with the results of comparison.

The phase comparison frequency updater changes the coefficients of the phase filters for determining phases corresponding to the plurality of peak filters in accordance with the preset frequencies. The plurality of peak filters may have the same initial preset frequencies and differ in operation start time.

When a center frequency is reached due to convergence that is provided by operating one of the plurality of peak filters, the position error signal may be examined. If a predetermined value is exceeded by the value of the position error signal, an unoperated peak filter may be operated. The operation of an unoperated peak filter may be repeated for all the peak filters.

When a center frequency is reached due to convergence that is provided by operating one of the plurality of peak filters with the same initial preset frequency employed for the plurality of peak filters, the position error signal may be examined. If a predetermined value is exceeded by the value of the position error signal, an unoperated peak filter may be operated. The plurality of peak filters may be digital peak filters.

The present invention provides a magnetic disk drive that exhibits excellent overall stability of a feedback control system even when the preset frequency for the peak filter significantly changes. The present invention also provides a magnetic disk drive that uses a plurality of peak filters to inhibit the magnetic head position from being displaced by a plurality of disturbances.

DETAILED DESCRIPTION OF THE INVENTION

Figure 8:
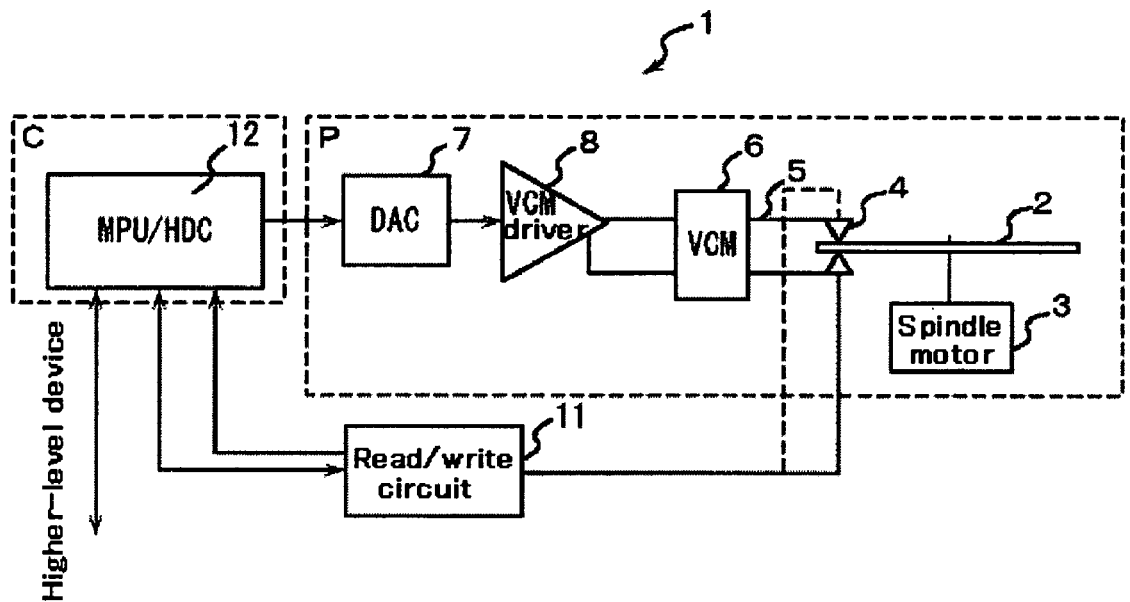
FIG. 8 is a block diagram that illustrates essential parts of a magnetic disk drive.

The configuration of a magnetic disk drive according to an embodiment of the present invention and the method for positioning a magnetic head will now be described. FIG. 8 is a block diagram that illustrates essential parts of the magnetic disk drive 1. The magnetic disk drive 1 is a data reader/writer. This data reader/writer allows a positioning mechanism, which comprises a voice coil motor (VCM) 6, to position a magnetic head 4 at a specific position (track) of a magnetic disk 2 that is rotated by a spindle motor 3, and writes data onto the magnetic disk 2 or reads data written on the magnetic disk 2. One or more magnetic disks are incorporated as needed in the magnetic disk drive 1.

Figure 9:
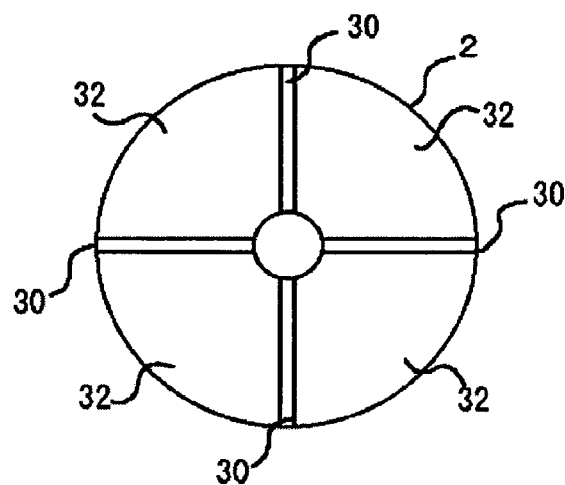
FIG. 9 is a conceptual diagram that illustrates magnetic disk recordings.
Figure 10:
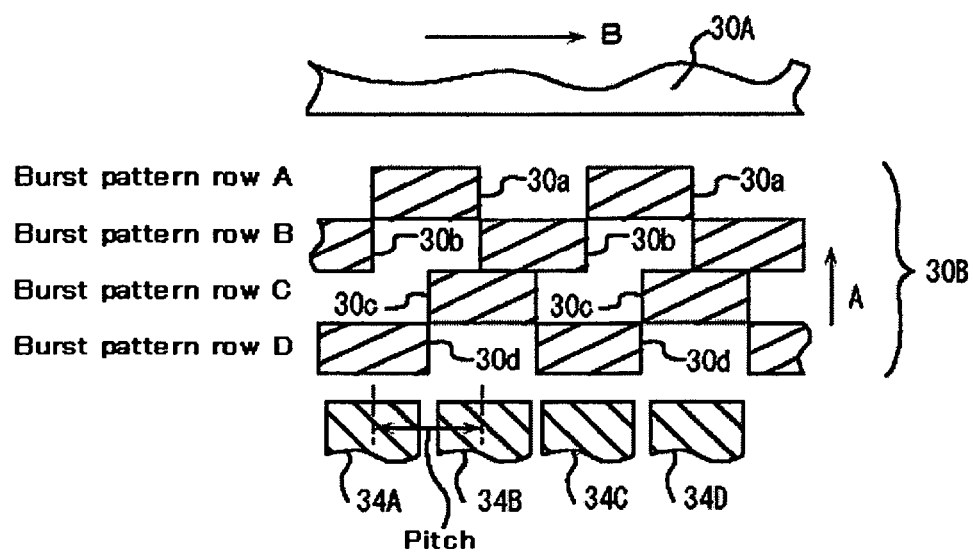
FIG. 10 is a conceptual diagram that illustrates part of magnetic disk recordings.

While the magnetic disk drive 1 is operating, the magnetic disk 2 is driven to rotate around a spindle shaft of the spindle motor 3. While the magnetic disk drive 1 is not operating, the magnetic disk 2 is stopped and not rotating. Each recording surface of the magnetic disk 2 has a plurality of servo data recording areas 30, which are radially formed in the direction of the diameter of the magnetic disk 2 as shown in FIG. 9. The remaining areas are referred to as user data recording areas 32. FIG. 10 shows a part of a servo data recording area 30 and a part of a user data recording area 32. In the user data recording area 32, a plurality of data tracks are concentrically formed at predetermined pitch intervals. FIG. 10 shows data tracks 34A, 34B, 34C, and 34D, which are among the plurality of data tracks. The magnetic head 4, which will be described later, moves in the circumferential direction of the magnetic disk 2 (in the direction of arrow A in FIG. 10) to read user data from or write user data to the data tracks 34.

The servo data recording area 30 is provided with a track identification information recording area 30A and a burst pattern recording area 30B. The track identification information recording area 30A records track identification information, which indicates the track address of each data track 34 in gray code (cyclic binary code). A burst pattern is formed in the burst pattern recording area 30B. As shown in FIG. 10, there are four burst pattern rows (burst pattern rows A through D) in which signal recording areas (hatched portions in FIG. 10) are arranged in the arrangement direction of the data tracks 34, that is, in the direction of the diameter of the magnetic disk 2.

The signal recording areas constituting each burst pattern row are such that the length in the direction of the diameter of the magnetic disk 2 and the interval between neighboring areas are equal to the pitch of the data tracks 34. The signal recording area 30a of burst pattern row A and the signal recording area 30b of burst pattern row B zigzag in the direction of the diameter of the magnetic disk 2. The sides of both ends of the areas positioned along the direction of the diameter of the disk correspond to the widthwise center of each data track 34. When signals are recorded in the areas, burst pattern rows A and B are formed. The signal recording area 30c of burst pattern row C and the signal recording area 30d of burst pattern row D zigzag in the direction of the diameter of the magnetic disk 2. Further, the sides of both ends of the areas positioned along the direction of the diameter of the disk correspond to the boundary between the data tracks 34. When signals are recorded in the areas, burst pattern rows C and D are formed.

Two magnetic heads 4 are mounted on the leading end of an actuator 5. These magnetic heads 4 correspond to the front and back surfaces of the magnetic disk 2. The magnetic heads 4 perform a data read/write operation in relation to the magnetic disk 2. The magnetic heads 4 also read servo data that is recorded on the magnetic disk 2. The magnetic heads 4 and the actuator 5 move, as an assembly, in the radial direction of the magnetic disk 2. A read/write circuit 11 performs a data read/write process. More specifically, the read/write circuit 11 converts write data (user data), which is transferred from a higher-level device via an MPU/HDC 12, into a write signal (electrical current) and supplies it to a magnetic head 4. In accordance with the write current, the magnetic head 4 writes user data onto the magnetic disk 2. Meanwhile, the read/write circuit 11 converts a read signal (electrical current), which is read from the magnetic disk 2, into digital data and outputs the digital data to a higher-level device via the MPU/HDC 12. The digital data contains servo data.

The actuator 5 is driven by the VCM 6. Therefore, the VCM 6 can drive the magnetic heads 4. The VCM 6 comprises a mover, which is made of a coil, and a stator, which is made of a permanent magnet. When a VCM driver 8 supplies a predetermined current to the coil, the mover is driven so as to move the magnetic heads 4 until each is positioned at a specified position on the magnetic disk 2.

The MPU/HDC 12 determines the position of the magnetic heads 4 in accordance with a signal input from the read/write circuit 11, generates a control signal for controlling the position of the magnetic heads 4 in accordance with the deviation of the determined position of the magnetic heads 4 from a target position of the magnetic heads 4 as described later, and outputs the control signal to a DAC 7, which is connected to the MPU/HDC 12. More specifically, this control signal is a motor current control signal for controlling a current that flows to a voice coil of the VCM 6. The MPU/HDC 12 will be described in detail later. The DAC 7 converts a positioning control current, which is output from the MPU/HDC 12, to an analog signal (voltage signal), and outputs the analog signal to the VCM driver 8. The VCM driver 8 converts the voltage signal, which is received from the DAC 7, to a drive current, and supplies the drive current to the VCM 6.

Figure 11:
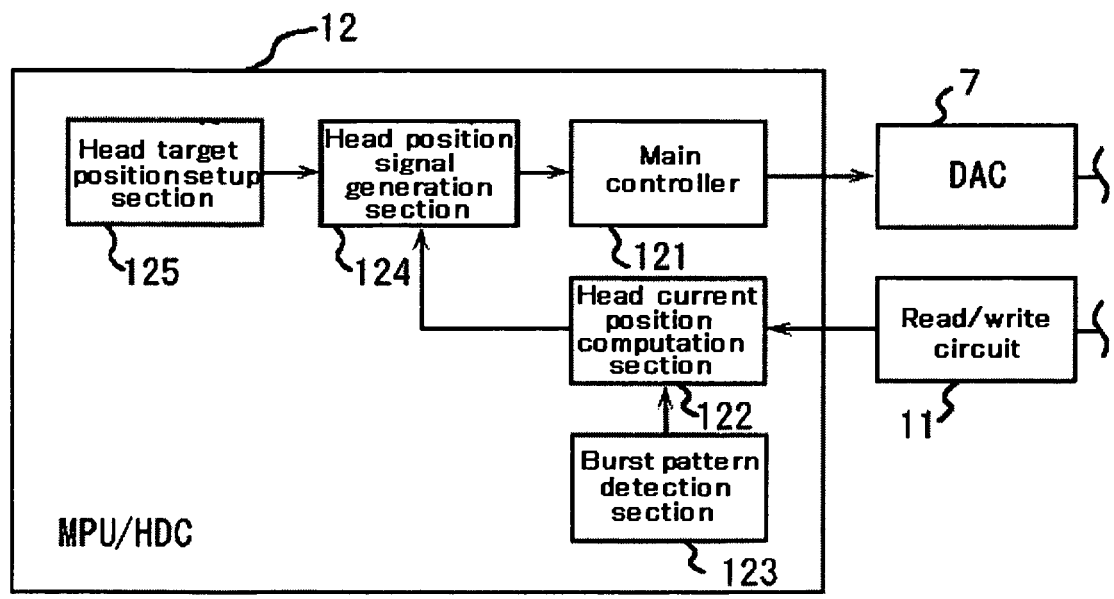
FIG. 11 illustrates the configuration of a controller for the magnetic disk drive.

FIG. 11 is a functional block diagram illustrating the functionality of a control system, which is incorporated in the MPU/HDC 12. The control system provides a function for controlling the position of the magnetic heads 4 so that the position of the magnetic heads 4 follows a position corresponding to a specified data track 34 (performs a track following operation) while a magnetic head 4 reads or writes information. When a signal is output from the read/write circuit 11, it enters a head current position computation section 122 and a burst pattern detection section 123. The burst pattern detection section 123 examines the input signal to judge whether the position of the magnetic heads 4 matches a burst pattern recording area 30B, and outputs the obtained judgment result to the head current position computation section 122. While the burst pattern detection section 123 judges that the position of the magnetic heads 4 matches the burst pattern recording area 30B, the head current position computation section 122 acquires a signal output from the read/write circuit 11, uses the acquired signal to calculate a position along the direction of the diameter of the magnetic disk 2 to which the positions of the magnetic heads 4 currently correspond (the current position of the magnetic heads 4), and outputs the calculation result. Therefore, the head current position computation section 122 outputs the current head position at predetermined intervals.

A head target position setup section 125 sets and outputs a target position of the magnetic heads 4, which is expressed in terms of a position along the direction of the diameter of the magnetic disk 2. If the lengthwise central position (center) of a gap corresponding to a read element of a magnetic head 4 or a gap corresponding to a write element of a magnetic head 4 is displaced (offset), the head target position setup section 125 sets and outputs, as a target position of the magnetic head 4, a value that varies when the information from a data track 34 is read and written (e.g., a value for providing agreement between the read element gap center and data track center at the time of a read or a value for providing agreement between the write element gap center and data track center at the time of a write). The head current position, which is output from the head current position computation section 122, and the head target position, which is output from the head target position setup section 125, enter a head position signal generation section 124. The head position signal generation section 124 compares the entered head current position against the head target position and outputs a head position error signal (PES), which indicates the magnitude and direction of the deviation of the head current position from the head target position (indicates whether the deviation of the head current position from the head target position is oriented toward the inner or outer area of the magnetic disk 2).

Figure 12:
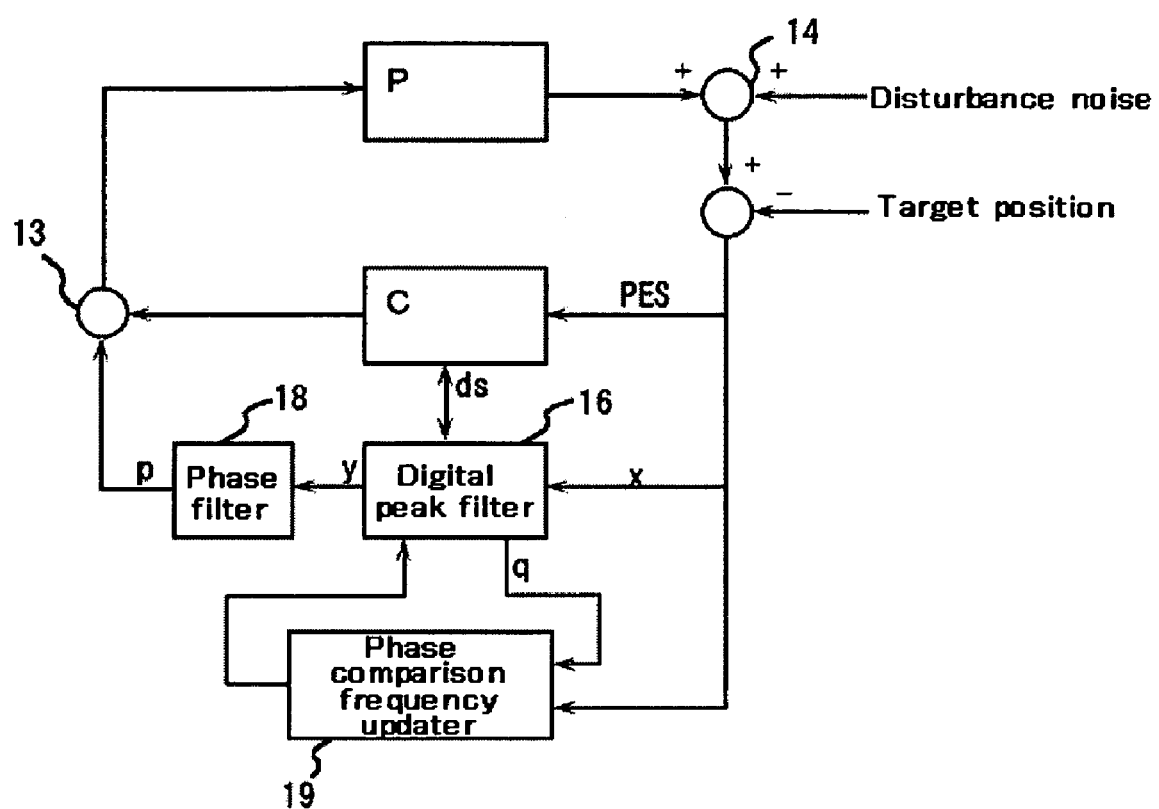
FIG. 12 is a model block diagram illustrating the magnetic disk drive shown in FIG. 8.

FIG. 12 is a model block diagram that is derived from a magnetic disk drive shown in FIG. 8. This block diagram will now be used to describe a method for using a peak filter (digital peak filter) to inhibit head positional displacement that is caused by disturbance noise. In FIG. 12, the symbol P denotes a model representing the VCM 6 and magnetic heads 4. It outputs a head current position signal. The symbol C denotes a controller that comprises the MPU/HDC 12. It inputs a position error signal PES, calculates a value that provides control system stability, and outputs the calculated value to addition point 13. When disturbance noise is added to the head current position signal (displayed as addition point 14), signal x, which contains the disturbance noise, enters a digital peak filter 16. The output y from the digital peak filter 16 enters a phase filter 18. The output p from the phase filter 18 is delivered to addition point 13 and added to the output of the controller C.

A phase comparison frequency updater 19 compares the phase of signal x against the signal phase of an internal variable q of the peak filter 16. The preset frequency for the peak filter 16 is then updated in accordance with the result of comparison. The update/stability confirmation method is not described herein because it is detailed in "Frequency-Following Peak Filter" (Masashi Kisaka, Industrial Measurement/Control Study Group Literature of Institute of Electrical Engineers; Sep. 10, 2004). Even if the preset frequency for the peak filter 16 is changed in a situation where the preset frequency greatly varies, the feedback system's overall stability may be impaired.

Figure 1:
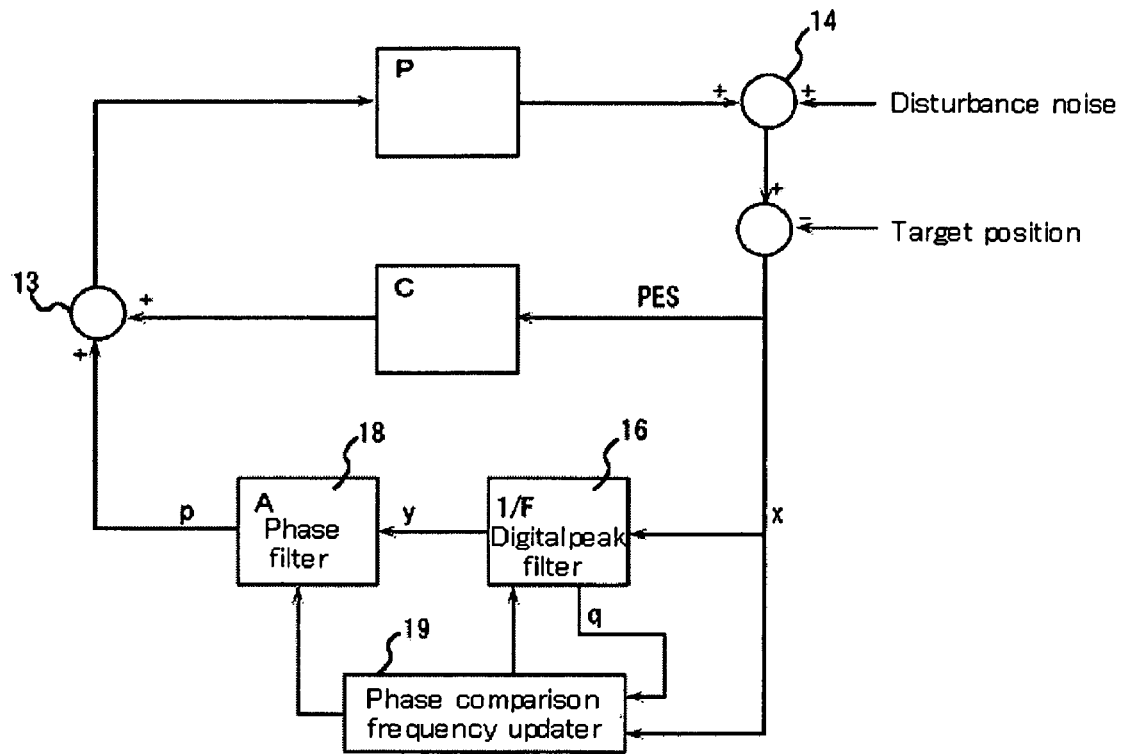
FIG. 1 is a model block diagram illustrating a magnetic disk drive according to one embodiment of the present invention.

FIG. 1 is a model block diagram that is derived from a magnetic disk drive according to one embodiment of the present invention. This block diagram will now be used to describe a method for inhibiting the head position from being displaced by disturbance noise. When disturbance noise is added to a magnetic head current position signal, the influence of disturbance noise addition is averted by changing the frequency response of the peak filter (digital peak filter) 16 in accordance with the input/output phase difference of the digital peak filter 16. For the input/output phase difference of the digital peak filter 16, a combination of input signal x and output signal y or a combination of input signal x and output signal p of the phase filter 18 can be used in addition to the above-mentioned method. In this instance, the resulting phase shift is greater than when a combination of x and q is used. Therefore, the update algorithm stabilization conditions change. In the present embodiment, the transfer function for determining the phase of the digital peak filter 16 is changed in accordance with the preset frequency with a view toward preventing the feedback system stability from being impaired. The transfer function frequency response 1/F of the digital peak filter 16 can be expressed by the following equation.

$$1/F = 1/(z^2 - 2r\cos\omega pz + r^2)$$

The symbol z is z of Z conversion; r is a constant; and $\omega p$ is the preset frequency. When r=1, disturbance noise having a frequency of $\omega p$ is completely inhibited. The phase filter 18 determines the phase of the digital peak filter 16. The symbol A denotes a transfer function for determining the phase of the digital peak filter 16. The transfer function A of the phase filter 18 can be changed with the preset frequency $\omega p$ for the digital peak filter 16.

Figure 2:
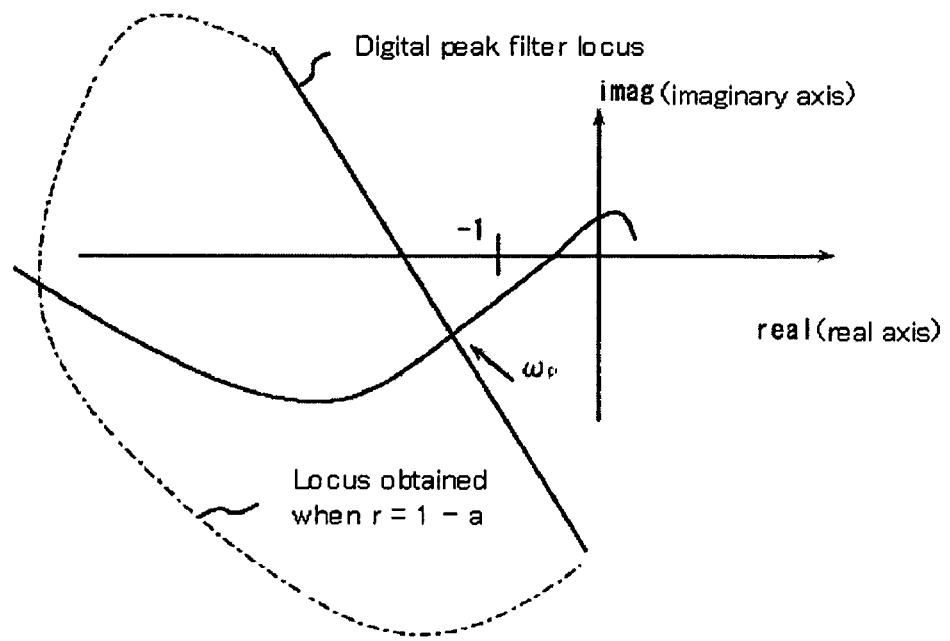
FIG. 2 is a Nyquist diagram of an open loop function.

If the gain of the digital peak filter 16 is sufficiently small at a frequency other than the preset frequency $\omega p$, the Nyquist diagram of an open loop function looks like FIG. 2. At $\omega p$, the Nyquist diagram provides an infinite circle due to the peak filter (digital peak filter's locus). Stability judgment will now be described. When the value r is asymptotically changed to 1 from a value smaller than 1, a stable filter is inserted. Therefore, stability results when the number of revolutions is not increased (the locus that is obtained when r=1−α). When the value r is asymptotically changed to 1 from a value greater than 1, an unstable filter is inserted. In this instance, stability results when the number of revolutions is increased. However, the same conclusion is reached in either case. Therefore, the subsequent explanation assumes that the value r is asymptotically changed to 1 from a value smaller than 1.

A system for which the sampling frequency Fs is 11,520 Hz is used as an example. When a digital peak filter providing system stability at a preset frequency $\omega p$ of 200 Hz is designed, the symbol A in FIG. 1, for example, is as indicated below:

$$A_{200} = -0.0106 + 0.0101z$$

Figure 3:
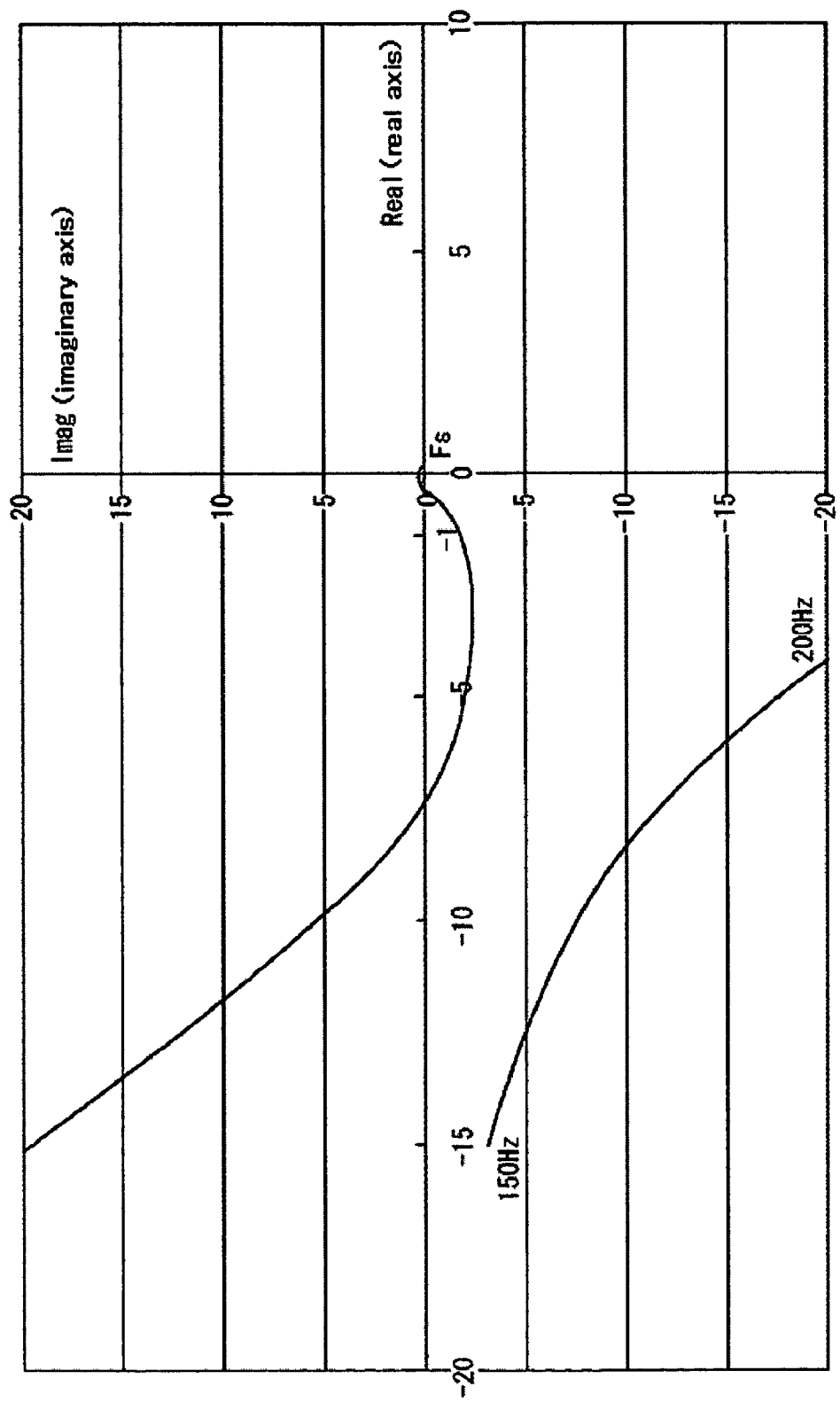
FIG. 3 is a Nyquist diagram that prevails within a sampling frequency range of 150 Hz to Fs/2.
Figure 4:
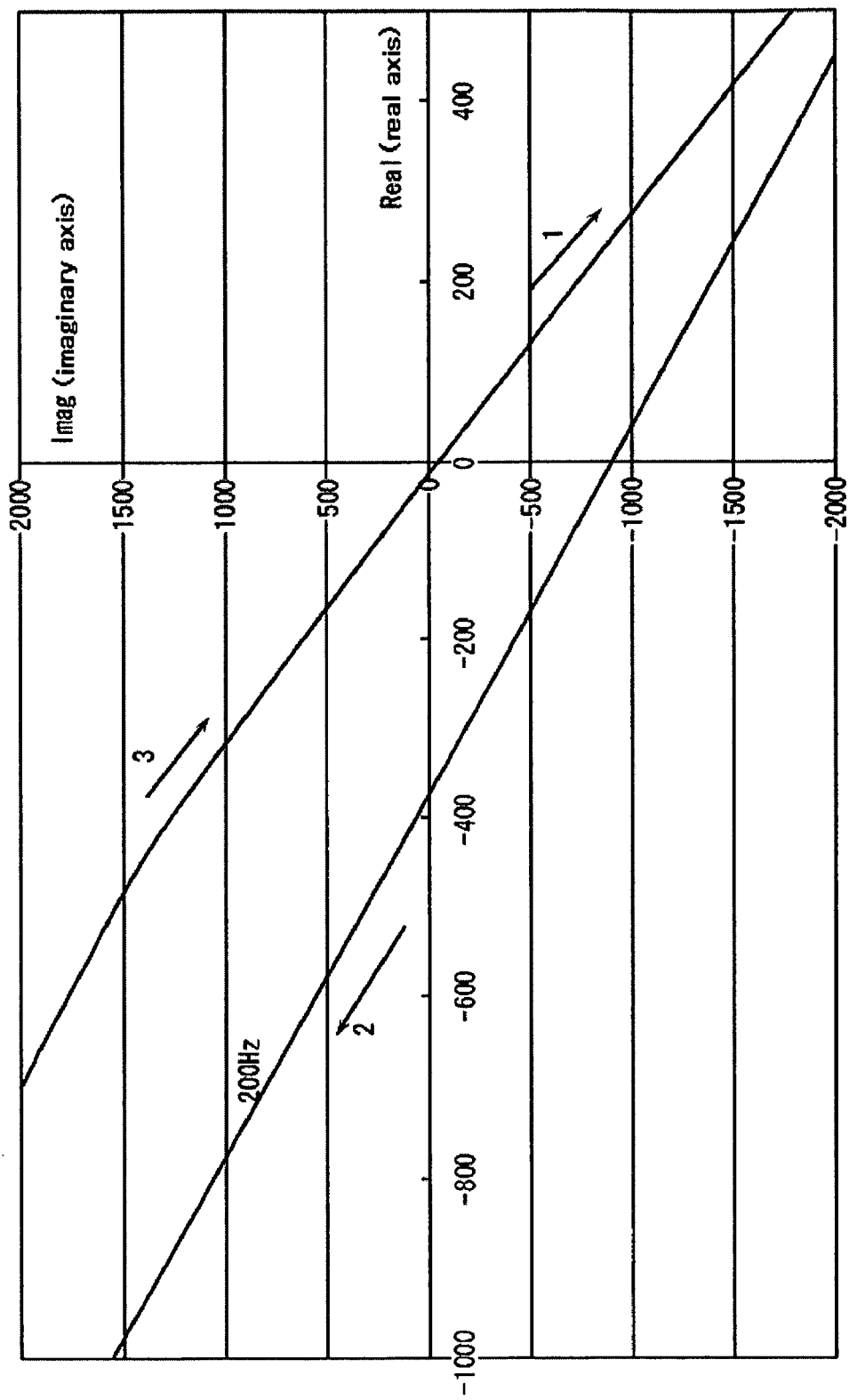
FIG. 4 presents an enlarged view of the Nyquist diagram in FIG. 3.
Figure 5:
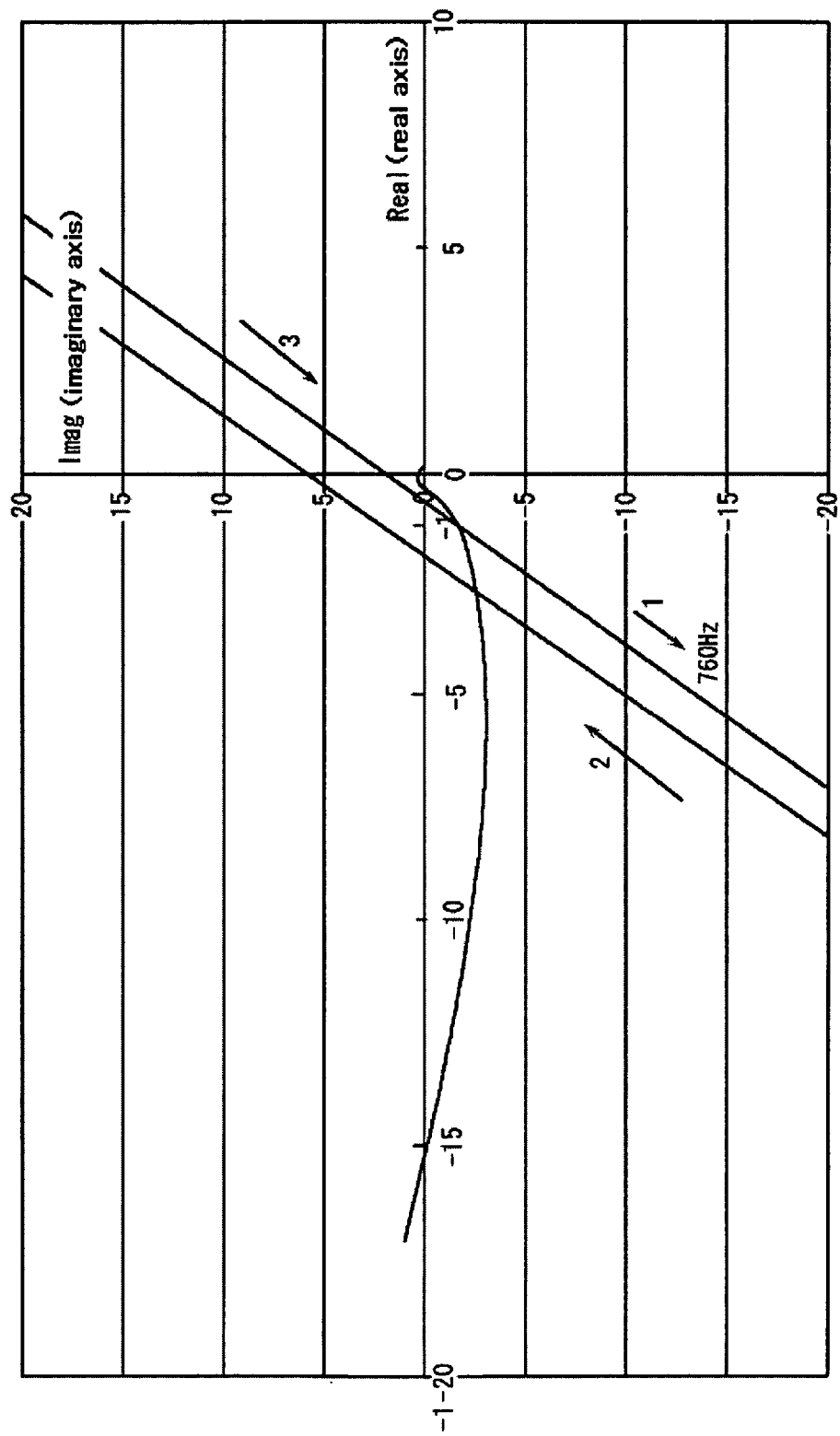
FIG. 5 is a Nyquist diagram that prevails at a sampling frequency of 760 Hz.
Figure 6:
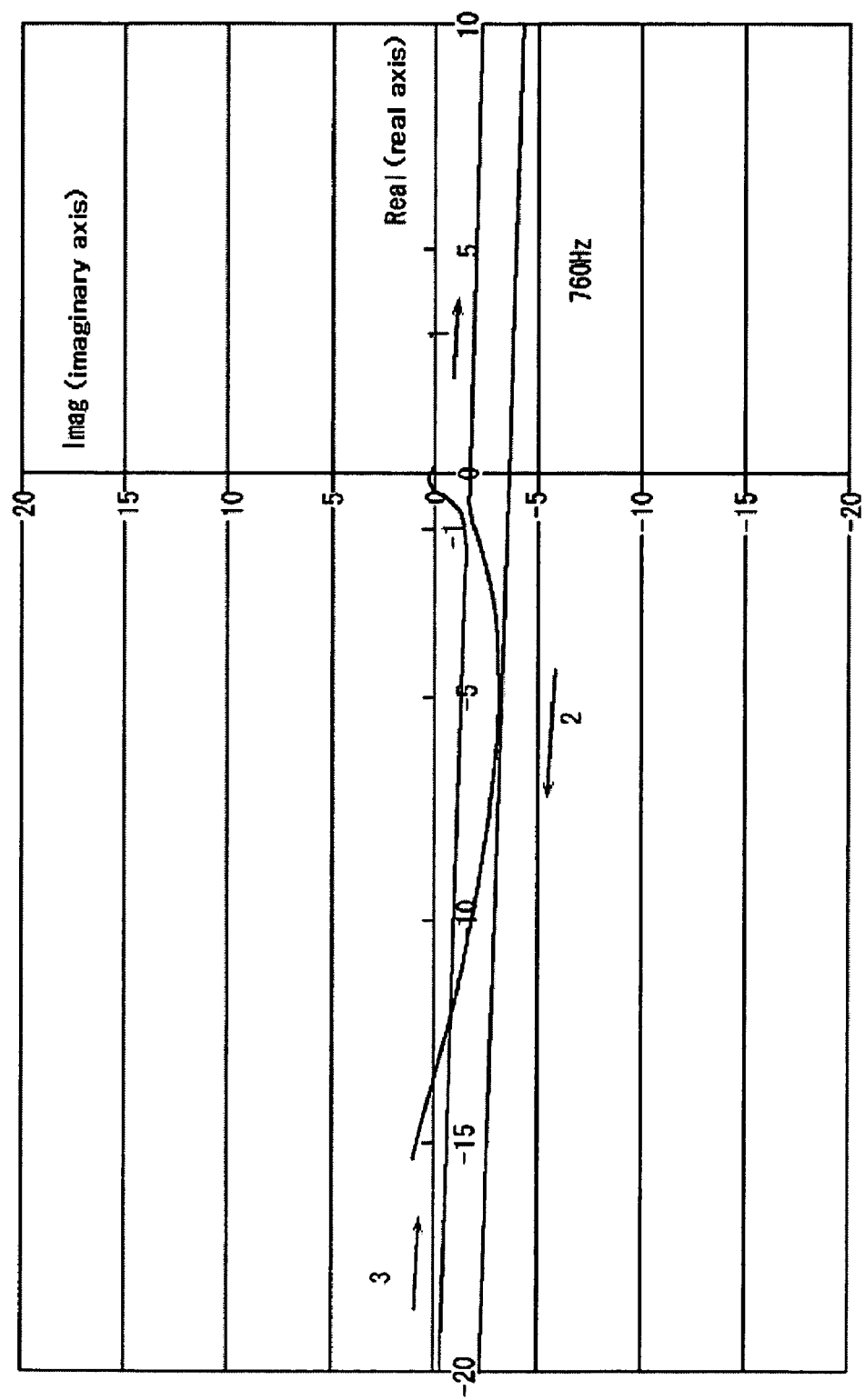
FIG. 6 is a Nyquist diagram that prevails when the preset frequency is stabilized at 760 Hz.
Figure 7:
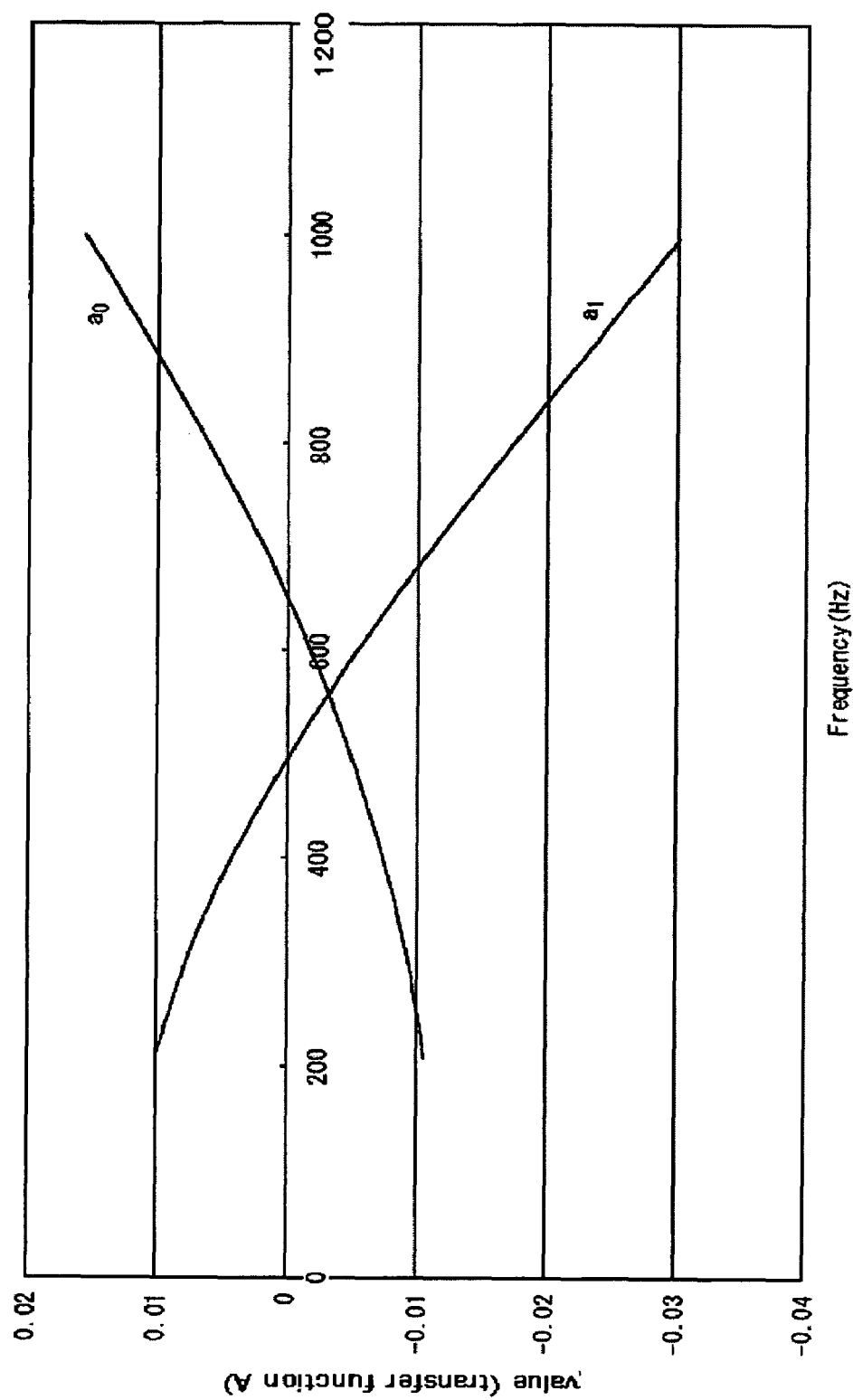
FIG. 7 illustrates filter coefficient A, which provides system stabilization in accordance with a peak frequency.

In this instance, the Nyquist diagram prevailing within a frequency range of 150 Hz to Fs/2 looks like FIG. 3. FIG. 3 provides calculations on the assumption that r=0.999999. FIG. 3 indicates the circumference of (−1, 0) and provides an infinite circle at a frequency of 200 Hz. FIG. 4 presents a larger view that is derived from FIG. 3. FIG. 5 is obtained by selecting a peak filter preset frequency of 760 Hz while the value A remains unchanged. The resulting locus passes through the lines marked 1, 2, and 3. In this instance, instability results because the number of revolutions is increased for (−1, 0). FIG. 6 shows a Nyquist diagram that prevails when the value A is changed so that the preset frequency $\omega p$ for the digital peak filter 16 steadily remains at 760 Hz. In the neighborhood of a 760 Hz peak, the locus passes through the lines marked 1, 2, and 3 in FIG. 6. It is stable because it does not enclose (−1, 0). Therefore, stabilization can be achieved. However, it is achieved only when the transfer function A is changed. When calculations are performed elaborately, the value shown in FIG. 7 is obtained as the transfer function A (a0+a1z) for stabilizing the system in accordance with the peak frequency.

As described above, the present embodiment changes the transfer function, which determines the phase of the digital peak filter, in accordance with the preset frequency for the digital peak filter. Therefore, the feedback system's overall stability remains unimpaired even when the preset frequency significantly changes.

Figure 13:
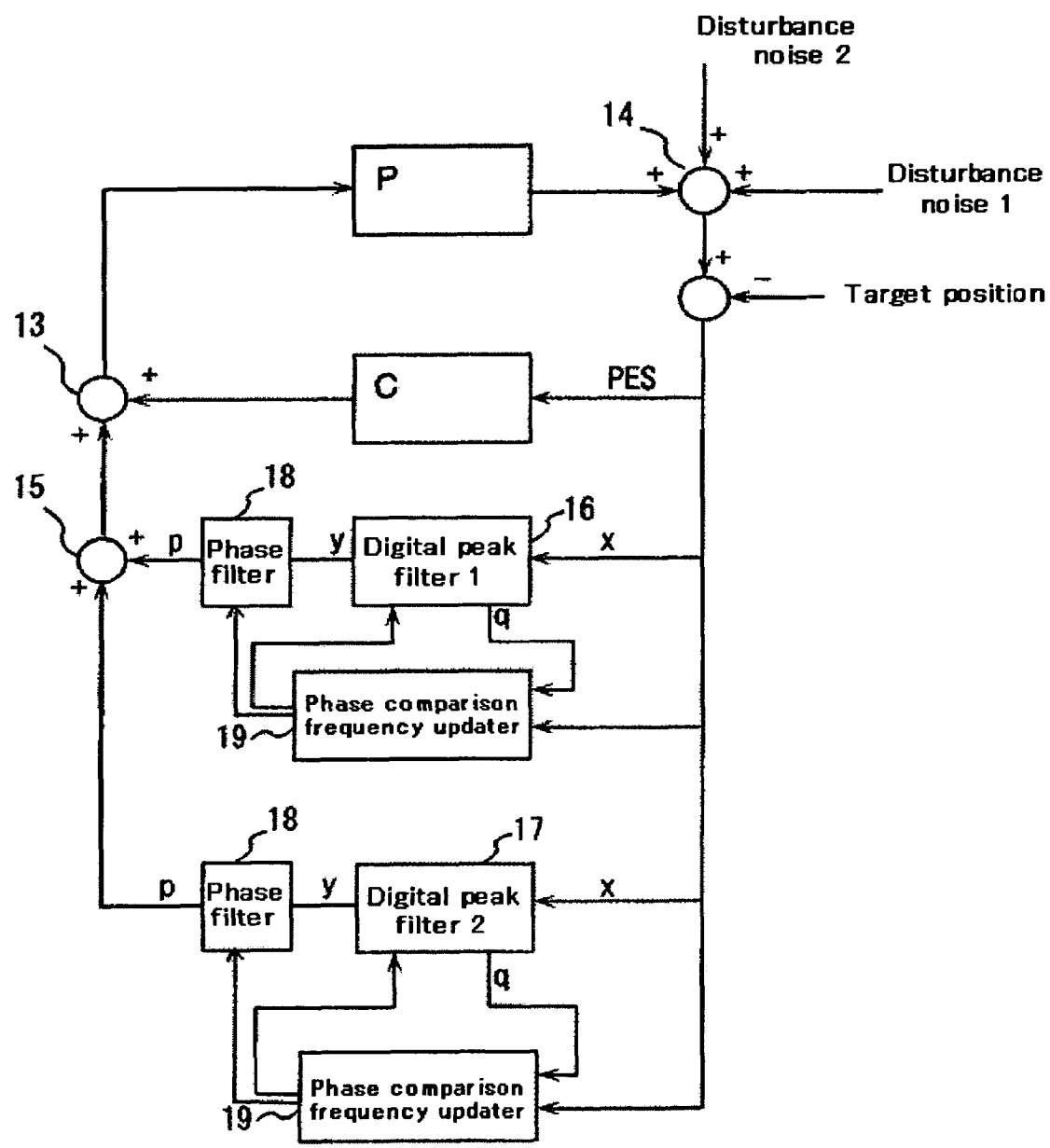
FIG. 13 is a model block diagram that illustrates a magnetic disk drive according to a second embodiment of the present invention.
Figure 14:
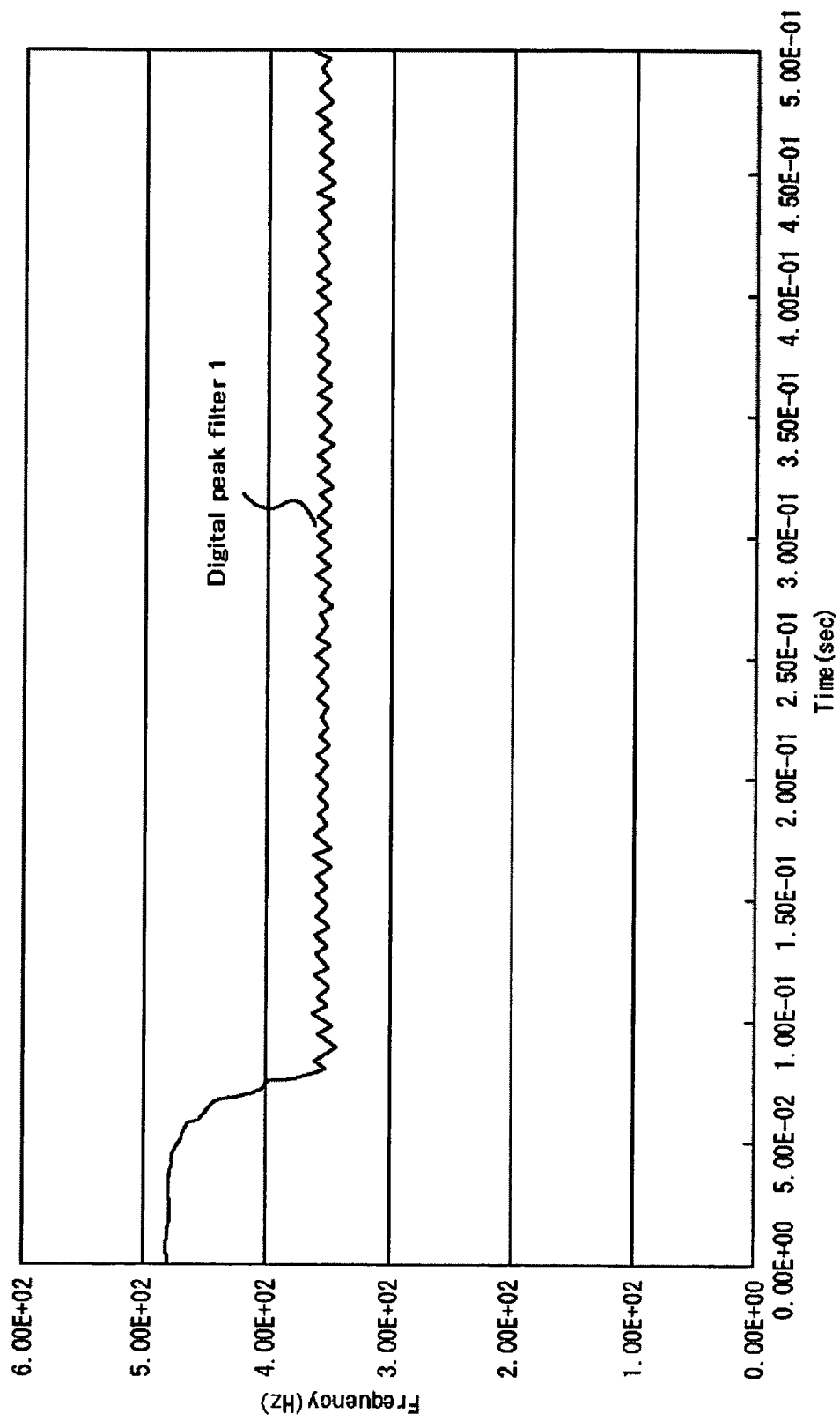
FIG. 14 illustrates center frequency convergence of digital peak filter 1.
Figure 15:
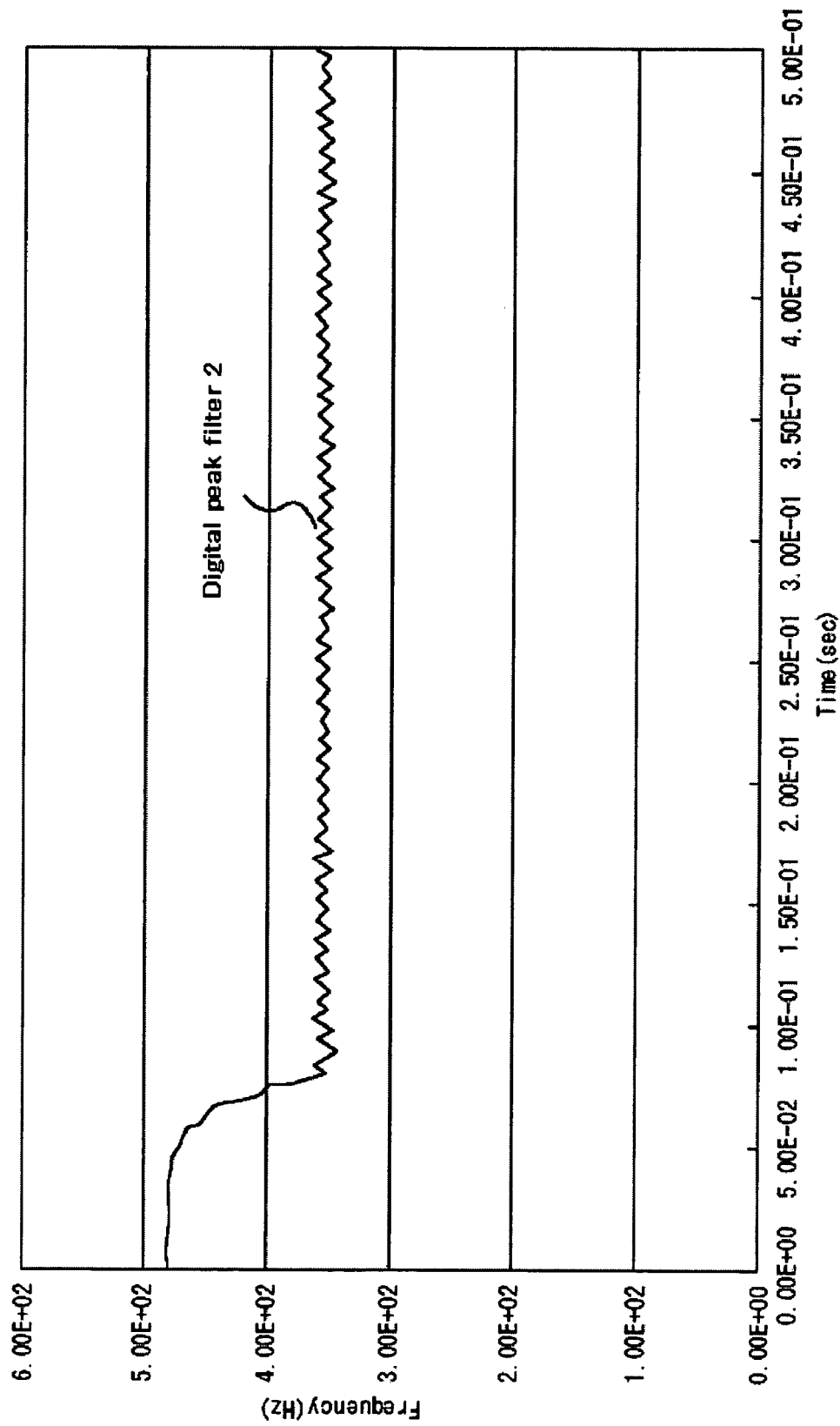
FIG. 15 illustrates center frequency convergence of digital peak filter 2.
Figure 16:
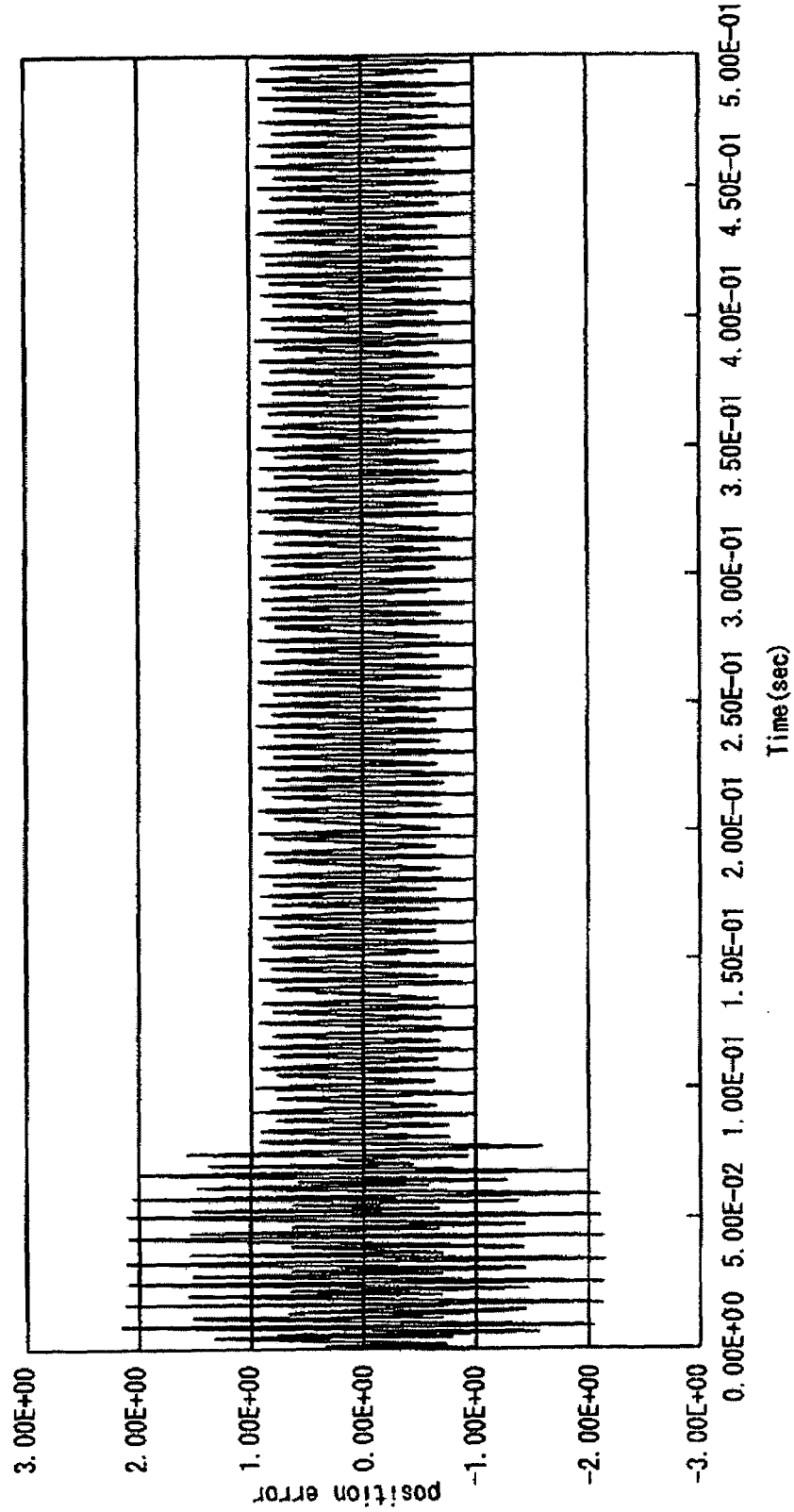
FIG. 16 illustrates a position error signal that is obtained when digital peak filters 1 and 2 operate at the same initial preset frequency.

A second embodiment in which a plurality of digital peak filters are used to inhibit the influence of a plurality of disturbance noises will now be described with reference to a block diagram shown in FIG. 13. It is assumed that the disturbance noise frequencies are 240 Hz and 360 Hz. FIGS. 14 and 15 illustrate the center frequency convergence of digital peak filter 1 (16) and digital peak filter 2 (17) in a case where the digital peak filters are incorporated in the feedback system and operated with the same initial preset frequency employed. Since digital peak filters 1 and 2 are operated at the same initial preset frequency, they both achieve convergence to a disturbance noise frequency of 360 Hz. The position error signal obtained in this case is shown in FIG. 16. The figure indicates that the influence of disturbance noise remains evident. Therefore, the effects of the use of a plurality of digital peak filters are not produced.

Figure 17:
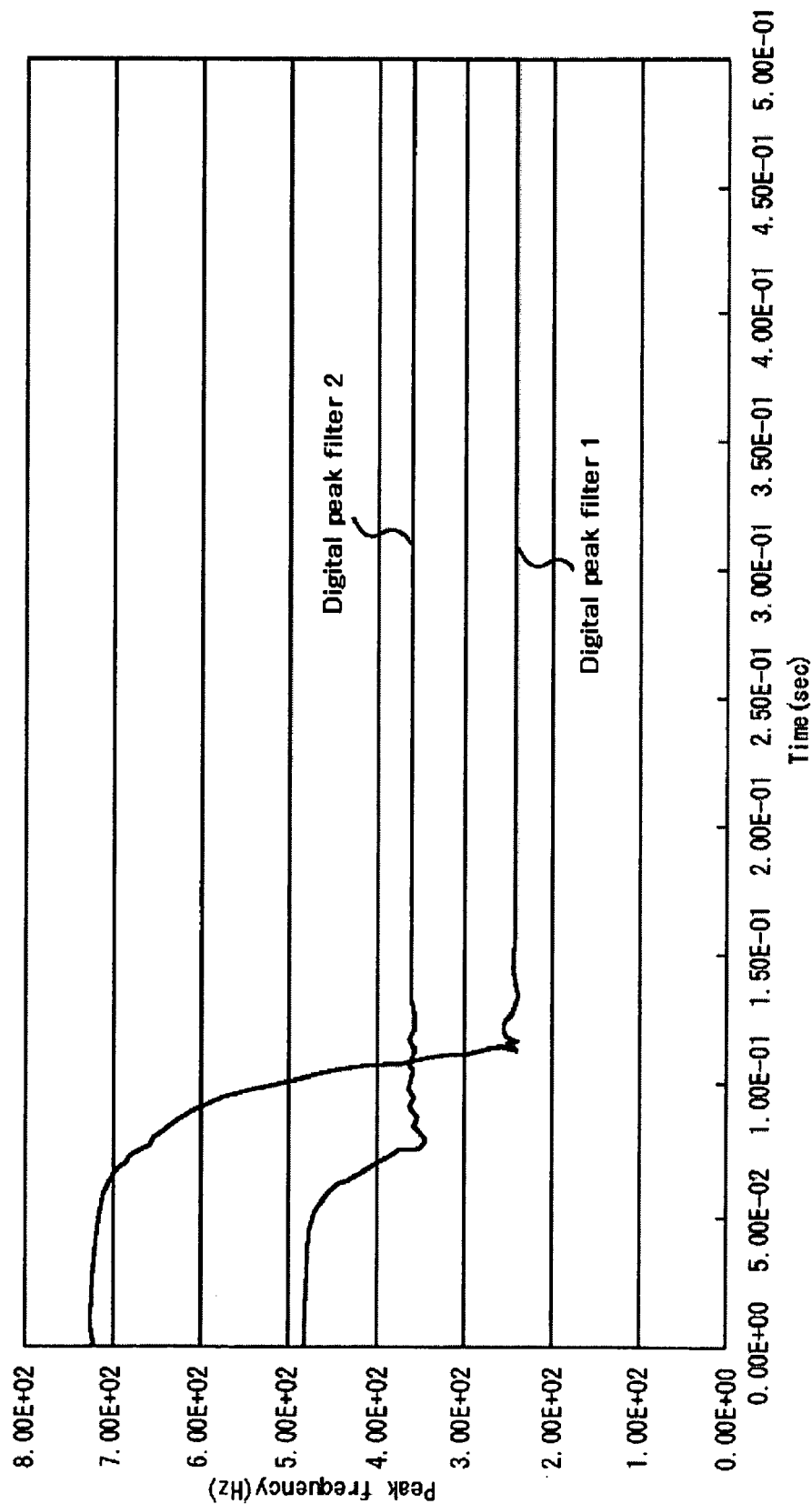
FIG. 17 illustrates center frequency convergence that is achieved when digital peak filters 1 and 2 operate at different initial preset frequencies.
Figure 18:
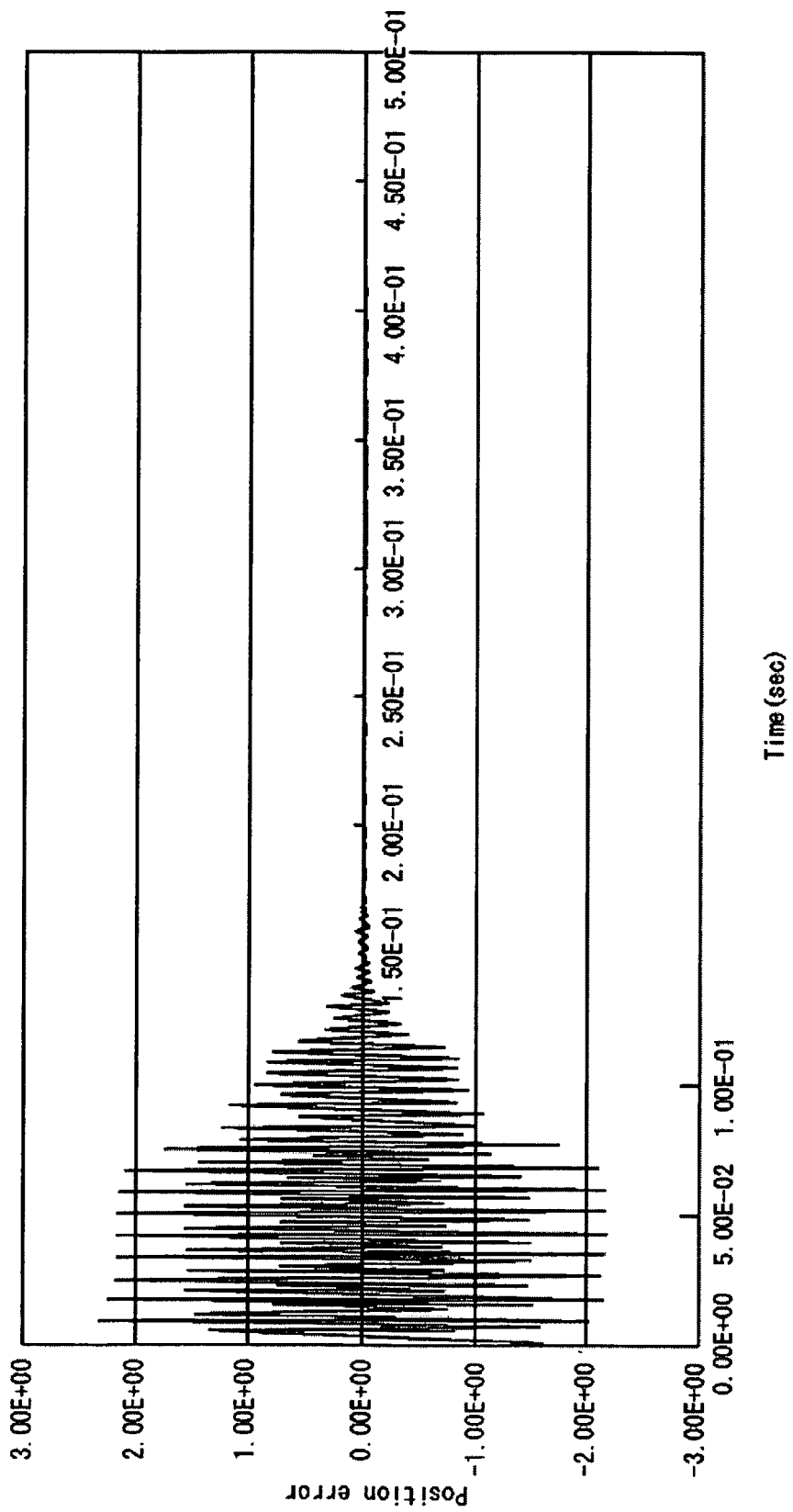
FIG. 18 illustrates a position error signal that is obtained when digital peak filters 1 and 2 operate at different initial preset frequencies.

As such being the case, the initial preset frequencies for digital peak filters 1 and 2 are now changed. As indicated in FIG. 17, digital peak filter 1 converges to 240 Hz disturbance noise whereas digital peak filter 2 converges to 360 Hz disturbance noise. The position error signal obtained in this instance is shown in FIG. 18. The figure indicates that the influence of disturbance noise is eliminated. It means that the use of a plurality of digital peak filters inhibits magnetic head positional displacement that may be caused by a plurality of disturbance noises.

Figure 19:
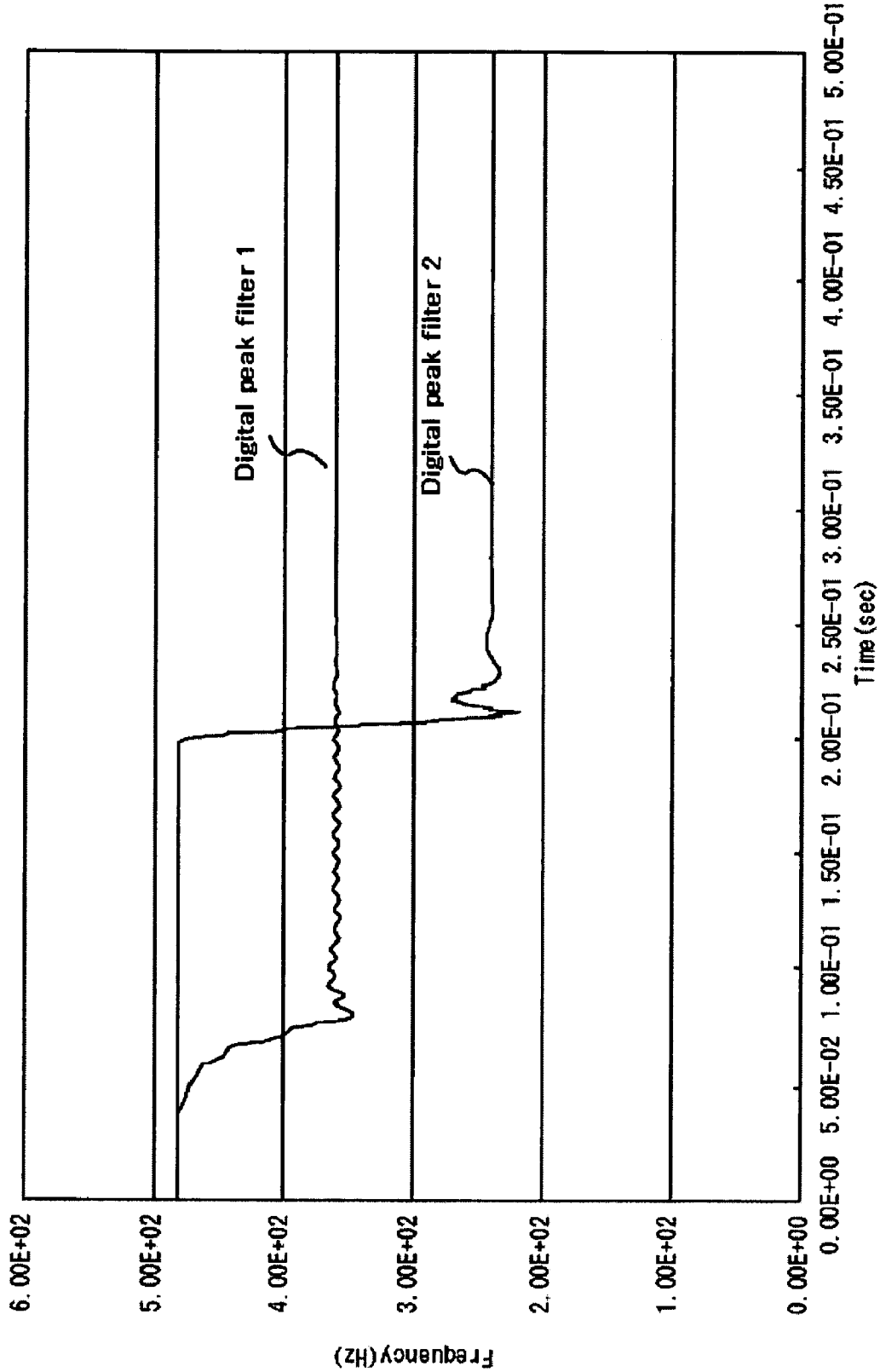
FIG. 19 illustrates center frequency convergence that is achieved when digital peak filters 1 and 2 start operating at different times.
Figure 20:
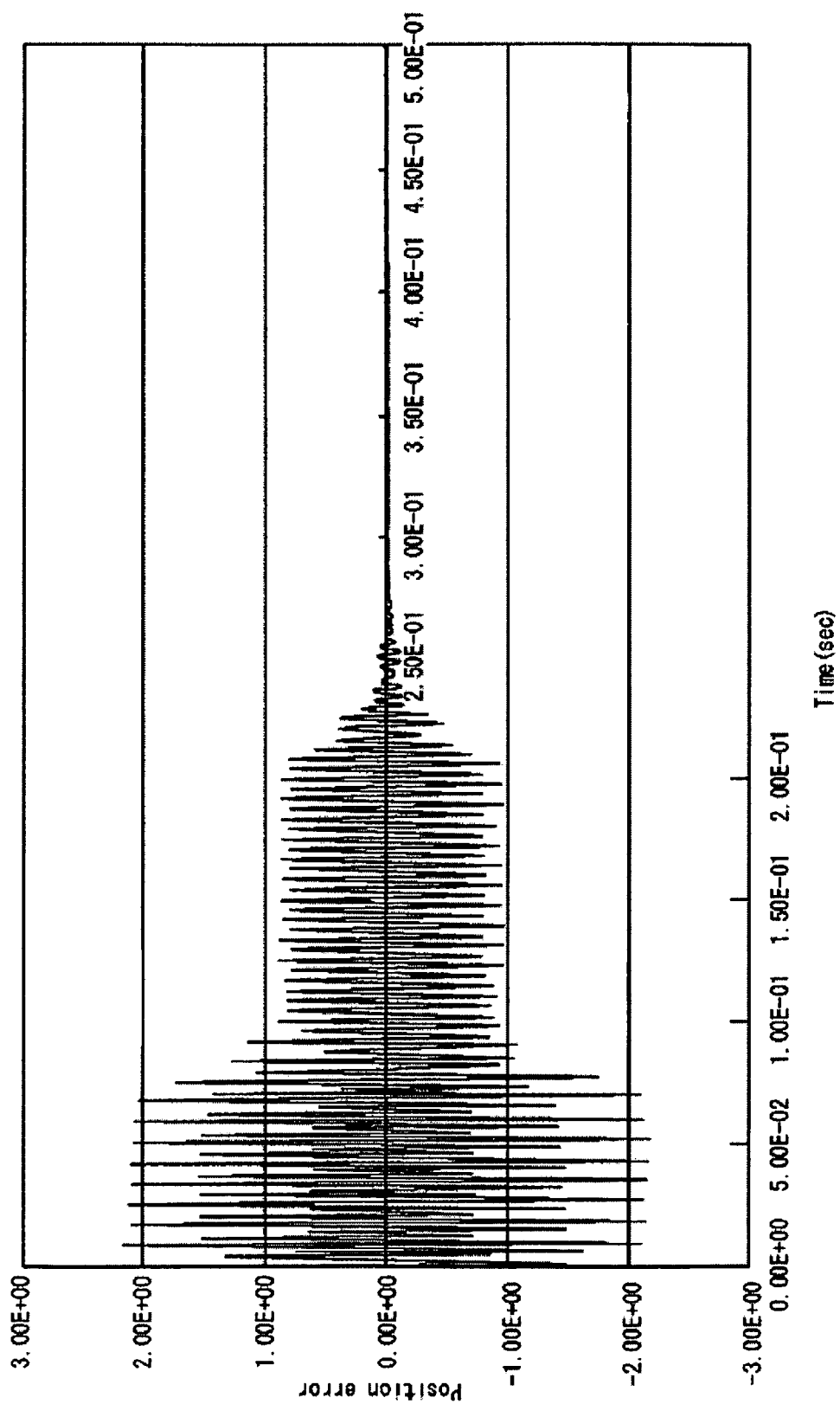
FIG. 20 illustrates a position error signal that is obtained when digital peak filters 1 and 2 start operating at different times.

In the above embodiment, the initial preset frequencies for the two digital peak filters are changed. Alternatively, however, the two digital peak filters may start operating at different times. FIG. 19 illustrates center frequency convergence in a case where digital peak filter 2 starts operating 0.2 second later than digital peak filter 1. Digital peak filter 1 converges to 360 Hz disturbance noise whereas digital peak filter 2 converges to 240 Hz disturbance noise. The position error signal obtained in this instance is shown in FIG. 20. The figure indicates that the influence of disturbance noise is eliminated. Further, the same effect can be produced as described above by operating digital peak filter 1, determining the position error signal value when center frequency convergence is achieved, and operating digital peak filter 2 when the determined value is greater than a predefined one.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a magnetic disk for recording user data and servo data;
   a magnetic head for reading/writing user data and reading servo data at a specified access position of said magnetic disk;
   a controller to generate a position error signal in accordance with a servo data signal read by said magnetic head and output a control signal for a drive device that moves said magnetic head;
   a peak filter to input the position error signal, wherein a gain is valid for a preselected frequency;
   a phase filter to determine the phase of said peak filter;
   a mechanism to position said magnetic head at the access position in accordance with a control signal output from said controller and a signal output from said phase filter; and
   a phase comparison frequency updater to compare a phase of the position error signal against an output signal phase of said peak filter, change a preset frequency for said peak filter in accordance with the result of comparison, and change a transfer function for determining the output signal phase of said peak filter in accordance with a change in the preset frequency.

2. The magnetic disk drive according to claim 1, wherein said phase comparison frequency updater compares the input signal phase of said peak filter against the output signal phase of said peak filter, and changes the preset frequency for said peak filter in accordance with the result of comparison.

3. The magnetic disk drive according to claim 1, wherein the transfer function is a coefficient of said phase filter.

4. The magnetic disk drive according to claim 1, wherein said peak filter is a digital peak filter.

5. A magnetic disk drive comprising:
   a magnetic disk for recording user data and servo data;
   a magnetic head for reading/writing user data and reading servo data at a specified access position of said magnetic disk;
   a controller to generate a position error signal in accordance with a servo data signal read by said magnetic head and output a control signal for a drive device that moves said magnetic head;
   a plurality of peak filters to input the position error signal, wherein a gain is valid for a preselected frequency;
   a plurality of phase filters to determine the phases of said peak filters;
   a mechanism to position said magnetic head at the access position in accordance with a control signal output from said controller and signal outputs from said plurality of phase filters; and
   a phase comparison frequency updater to compare a phase of the position error signal against output signal phases of said plurality of peak filters and change preset frequencies for said plurality of peak filters in accordance with the results of comparison.

6. The magnetic disk drive according to claim 5, wherein said phase comparison frequency updater compares the input and output signal phases of some or all of said plurality of peak filters on an individual peak filter basis and changes the preset frequencies for said plurality of peak filters in accordance with the results of comparison.

7. The magnetic disk drive according to claim 5, wherein said phase comparison frequency updater changes the coefficients of said phase filters for determining phases corresponding to said plurality of peak filters in accordance with the preset frequencies.

8. The magnetic disk drive according to claim 5, wherein at least some of said plurality of peak filters have the same initial preset frequencies and differ in operation start time.

9. The magnetic disk drive according to claim 5, wherein, when a center frequency is reached due to convergence that is provided by operating one of said plurality of peak filters, the position error signal is examined, and if a predetermined value is exceeded by the value of the position error signal, an unoperated peak filter is operated, and wherein the operation of an unoperated peak filter is repeated for all the peak filters.

10. The magnetic disk drive according to claim 5, wherein, when a center frequency is reached due to convergence that is provided by operating one of said plurality of peak filters with the same initial preset frequency employed for said plurality of peak filters, the position error signal is examined, and if a predetermined value is exceeded by the value of the position error signal, an unoperated peak filter is operated.

11. The magnetic disk drive according to claim 5, wherein said plurality of peak filters are digital peak filters.

12. A magnetic disk drive comprising:
   a magnetic disk for recording user data and servo data;
   a magnetic head for reading/writing user data and reading servo data at a specified access position of said magnetic disk;
   means for generating a position error signal in accordance with a servo data signal read by said magnetic head and outputting a control signal for a drive device that moves said magnetic head;
   a peak filter for inputting the position error signal, wherein a gain is valid for a preselected frequency;
   a phase filter for determining the phase of said peak filter;
   means for positioning said magnetic head at the access position in accordance with the control signal and a signal output from said phase filter; and
   update means for comparing a phase of the position error signal against an output signal phase of said peak filter, changing a preset frequency for said peak filter in accordance with the result of comparison, and changing a transfer function for determining the output signal phase of said peak filter in accordance with a change in the preset frequency.

13. The magnetic disk drive according to claim 12, wherein said update means compares the input signal phase of said peak filter against the output signal phase of said peak filter, and changes the preset frequency for said peak filter in accordance with the result of comparison.

14. The magnetic disk drive according to claim 12, wherein the transfer function is a coefficient of said phase filter.

15. The magnetic disk drive according to claim 12, wherein said peak filter is a digital peak filter.

* * * * *